(12) United States Patent
MacInnis et al.

(10) Patent No.: US 9,319,289 B2
(45) Date of Patent: Apr. 19, 2016

(54) ADAPTIVE BIT RATE (ABR) STREAMING WITH SERVER SIDE ADAPTATION

(71) Applicant: BROADCOM CORPORATION, Irvine, CA (US)

(72) Inventors: Alexander Garland MacInnis, Los Altos, CA (US); Rajesh Shankarrao Mamidwar, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 405 days.

(21) Appl. No.: 14/020,704

(22) Filed: Sep. 6, 2013

(65) Prior Publication Data

US 2014/0344443 A1 Nov. 20, 2014

Related U.S. Application Data

(60) Provisional application No. 61/823,327, filed on May 14, 2013.

(51) Int. Cl.
*G06F 15/16* (2006.01)
*H04L 12/26* (2006.01)
*H04L 29/06* (2006.01)
*H04L 29/08* (2006.01)

(52) U.S. Cl.
CPC ............... *H04L 43/08* (2013.01); *H04L 65/00* (2013.01); *H04L 65/602* (2013.01); *H04L 65/608* (2013.01); *H04L 65/80* (2013.01); *H04L 67/00* (2013.01)

(58) Field of Classification Search
CPC ...... H04L 43/08; H04L 65/602; H04L 65/608
See application file for complete search history.

(56) References Cited

U.S. PATENT DOCUMENTS

| 8,484,358 | B2 * | 7/2013 | Swenson | H04L 65/1076 709/227 |
| 8,635,357 | B2 * | 1/2014 | Ebersviller | H04N 19/46 709/224 |
| 8,874,777 | B2 * | 10/2014 | Ma | G06Q 30/0241 370/486 |
| 9,106,719 | B2 * | 8/2015 | Swenson | H04L 65/1076 |
| 2012/0005365 | A1 * | 1/2012 | Ma | G06Q 30/0241 709/231 |
| 2012/0281748 | A1 * | 11/2012 | Peng | H04N 19/149 375/240.01 |
| 2013/0282874 | A1 * | 10/2013 | Swenson | H04L 65/1076 709/219 |
| 2014/0359166 | A1 * | 12/2014 | Mamidwar | H04N 21/23439 709/247 |
| 2015/0089076 | A1 * | 3/2015 | Reza | H04N 21/2343 709/231 |
| 2015/0113104 | A1 * | 4/2015 | Ma | H04N 21/44209 709/219 |
| 2015/0163273 | A1 * | 6/2015 | Radcliffe | H04L 65/602 709/231 |
| 2015/0304197 | A1 * | 10/2015 | Nair | G06Q 30/0241 709/224 |

* cited by examiner

*Primary Examiner* — Moustafa M Meky
(74) *Attorney, Agent, or Firm* — McDermott Will & Emery LLP

(57) ABSTRACT

A device for providing adaptive bit rate streaming that includes a first transcoder configured to transcode a video stream based at least in part on an encoding characteristic to generate a first transcoded video stream, a network monitor configured to monitor network conditions including a network bandwidth of a network, an adjustment module configured to cause the transcoder to adjust the encoding characteristic in response to a change in the network conditions, an advertising module configured to advertise to a client device an ABR profile that corresponds to the first transcoded video stream, wherein the advertising module updates the advertised single ABR profile when the at least one encoding characteristic is adjusted, and a network interface configured to transmit segments of the first transcoded video stream to the client device via the network in response to requests therefor.

20 Claims, 3 Drawing Sheets

ADAPTIVE BIT RATE (ABR) STREAMING WITH SERVER SIDE ADAPTATION

CROSS-REFERENCE TO RELATED APPLICATIONS

This application claims the benefit of priority under 35 U.S.C. §119 from U.S. Provisional Patent Application 61/823,327 filed May 14, 2013, which is incorporated herein by reference in its entirety.

TECHNICAL FIELD

The present description relates generally to adaptive bit rate streaming, and more particularly, but not exclusively, to adaptive bit rate streaming with server side adaptation.

BACKGROUND

Adaptive bit rate (ABR) streaming is a technique used in streaming multimedia over communication networks, for example, the Internet. Some video streaming technologies may utilize streaming protocols such as Real Time Protocol (RTP) with Real Time Streaming Protocol (RTSP). ABR streaming technologies, however, are generally based on Hyper Text Transport Protocol (HTTP) and are designed to work efficiently over large networks that support HTTP, such as the Internet. The typical ABR streaming technique may have a scheme that partitions a video stream into sequence of segments with approximately equal durations in presentation timeline.

In some applications, ABR streaming may use one or more encoders that can encode a single source video stream at multiple bit rates to generate different bit rate representations. Each of the different bit rate representations may be partitioned into small segments. ABR clients may be provided with a manifest file that includes information regarding available segments of representations at differing bit rates. The client may request the segments of different representations (e.g., with different bit rates) depending on available resources determinable by the client (e.g., effective network performance). In general, this may result in a good experience for both network connections with various levels of effective performance as well as connections whose quality may vary over time.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

The subject technology includes a number of advantageous features that can substantially surpass the existing solutions in terms of performance, cost, speed, and user experience. For example, the disclosed subject matter describes an adaptive bit-rate (ABR) server that can substantially reduce the required dynamic random access memory (DRAM) bandwidth and utilization of processing resources by advertising a single ABR profile, while continuously monitoring network conditions and changing characteristics of the encoded stream associated with the profile (e.g. bit rate) based on the monitored network condition.

In one or more implementations, the ABR server may support a more rapid adaptation through the use two (or more) transcoders. For example, one of the transcoders may transcode the content at a bit rate determined based on the network conditions, while the other transcoder may transcode the content at the lowest expected bit rate. In this manner, the ABR server may quickly switch to the lower bit rate if the network conditions deteriorate rapidly. Further, in a local network (e.g., home or enterprise network), in particular when the available bandwidth is over-subscribed, the subject ABR server may be configured to divide the available bandwidth equitably among the ABR clients. In one or more implementations, the ABR server may provide a manifest that includes high bit rate profiles (e.g. 4 k resolution) that utilize channel bonding, which can optimize the use of the existing resources such as more than one communication channels, as described in greater detail herein.

Figure 1:
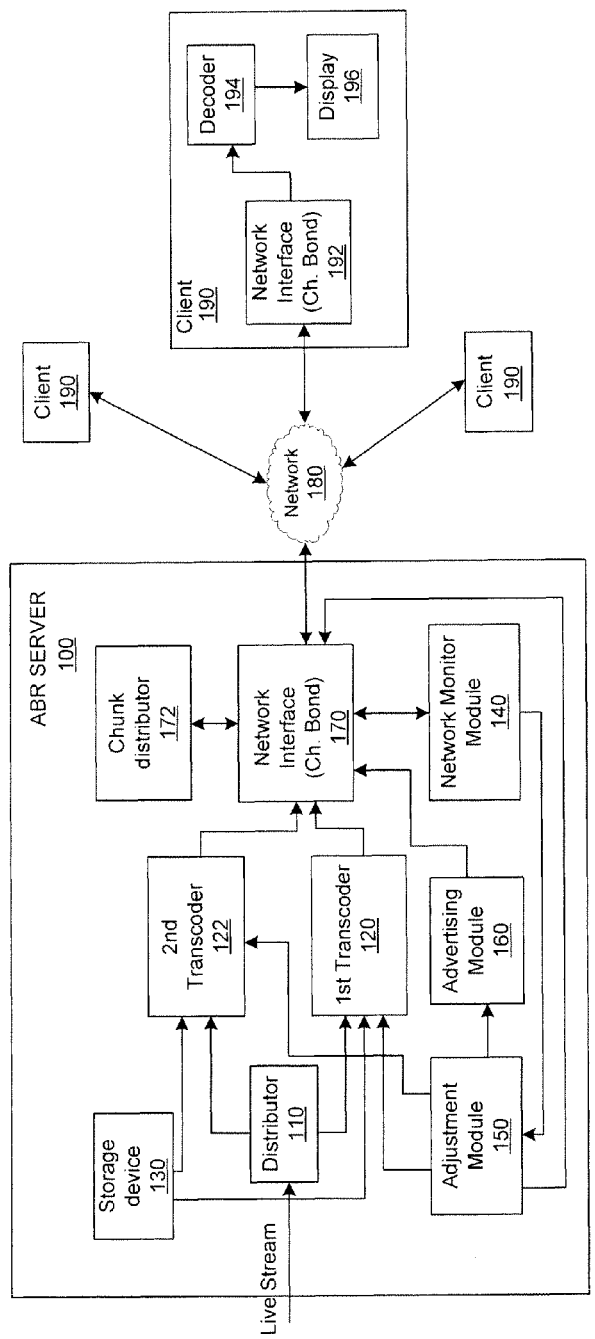
FIG. 1 illustrates examples of an adaptive bit-rate (ABR) server and a number of client devices, in accordance with one or more implementations.

FIG. 1 illustrates examples of an adaptive bit-rate (ABR) server 100 and a number of client devices 190, in accordance with one or more implementations of the subject technology. The ABR server 100 includes a distributor 110, a first transcoder 120, a second transcoder 122, a storage device 130 (e.g., digital video recorder (DVR), disk drive, flash memory, dynamic random access memory (DRAM), or other memory), a network monitoring module 140, an adjustment module 150, an advertising module 160, a network interface 170, and a chunk distributor 172. In some aspects, the first and the second transcoders 120 and 122 may be two threads of a single physical transcoder. The ABR server 100 may be coupled, via a network 180, to one or more client devices 190 (e.g., ABR client devices). Each client device 190 includes a network interface 192, a decoder 194, and a display 196. In one or more embodiments, the ABR server 100 may include a remote server, a home or enterprise gateway, or a set-top box (STB). The client device 190, in one or more implementations, may include a television set, a computer display, or a hand-held communication device such as a laptop, a tablet, a mobile phone, etc. The ABR client device 190 may be configured to perform one or more ABR streaming techniques, such as a Hyper Text Transport Protocol (HTTP) live streaming (HLS) technique.

In one or more implementations of the subject technology, the ABR server 100 may conserve resources by providing only one representation of each stream (e.g., audio and/or video stream) at a time, which is advertised to the client device. The ABR server 100 may adaptively change the bit rate and/or other encoding characteristics of the ABR stream, e.g. based on conditions of the network 180. An input to a transcoder (e.g., 120 or 122) may be a live stream provided by an external source or a recorded stream provided by the storage device 130. The distributor 110 may feed the live stream to the first and second transcoders 120 and 122, which are configured to transcode the input streams and to generate transcoded video streams. The network monitor module 140 may constantly monitor network conditions of the network 180. In one or more example embodiments, the network monitor module 140 may periodically send Hyper-Text Transport Protocol (HTTP) status requests, via the network interface 170, to one or more clients (e.g., client devices 190) or servers on the network 180 and measure metrics such as response time, availability, uptime, throughput, and latency, and based on the measurement results, estimate a current available bandwidth. In other example embodiments, the network monitor module 140 may estimate effective network performance by monitoring the timing of ACKs from a client in response to data transmitted by the server, or by monitoring the presence of ACKs and NACKs from a client. The network monitor module 140 may alert the adjustment module 150 of the changes in the network conditions (e.g., the available bandwidth). Further, the network monitor module 140 may keep track of the number of bits transferred to the client over a period of time, or transcoder output buffer level to detect the supported network bandwidth.

The adjustment module 150 may modify the encoding parameters of the first transcoder 120 to adjust one or more characteristics of the transcoded video stream, in response to a detected change in the network conditions. The one or more characteristic of the transcoded video stream may include, but is limited to, a compressed data rate, a frame size, a frame rate, or a video mode. For example, if the current video stream transmitted to the client device 190 is a 1080p60 video stream (e.g., a high definition video mode with a resolution of 1920× 1080, progressive frame format, and a frame rate of 60 frames/sec) while the available bandwidth is 6 Mbps, when the available bandwidth drops to, for example, 3 Mbps, the video stream with adjusted characteristics may be at 1080p30 (e.g., with a frame rate reduced to 30 frames/sec). In some aspects the frame size (e.g., number of pixels per frame) may be reduced, for example, by changing from 1080p to 720p or the video mode may be changed from 1080p (e.g., progressive frame mode) to 1080i (e.g., interlaced mode). For example, if a current video stream uses a relatively low bit rate and the available bandwidth is greater, the frame size, frame rate, format and/or quality of video may be increased to take advantage of the increased available bandwidth.

The network interface 170 may transmit segments of the transcoded video stream to the client device 190 via the network 180, e.g. in response to requests therefor. The advertising module 160 may advertise a single ABR profile for the video stream to the client device 190 through the network interface 170, e.g. via a manifest file. The single ABR profile may indicate the characteristics of the video stream being provided by the ABR server 100. Alternatively, the single ABR profile may not reflect the adjusted characteristics of the video stream being transmitted, and at least one of the actual characteristics of the stream may not match the corresponding characteristics in the advertised profile. This is in contrast to the existing ABR streaming solutions that advertise, through the manifest file, a number of different profiles (e.g., representations), for example, with different data rates. The manifest file transmitted by the ABR server 100 may only advertise the single ABR profile. Thus, there is only a single profile of segments of the video stream that the client device 190 may request from the ABR server 100 at any given time; however, the ABR server 100 may be continuously updating the encoding characteristics of the segments and continuously updating the single advertised profile, e.g. based on changing network conditions. In one or more implementations, the single ABR profile may be encoded by the first transcoder 120 operating at a 1× speed, which may result in a lower memory (e.g., DRAM) access bandwidth and associated hardware costs than transcoding multiple different profiles simultaneously.

In one or more implementations, the ABR server 100 may be able to adjust the characteristics of the transcoded video stream within a segment, e.g. without updating the encoding characteristics indicated by the single advertised profile. For example, the adjustment module 150 may be configured to cause the first transcoder 120 to adjust one or more characteristics of the transcoded video stream within a segment, without waiting to reach an end of the segment, which may be, for example, up to 10 seconds duration in presentation timeline. This may speed up adaptation to account for, e.g., dramatic and rapid fluctuations in network conditions.

The ABR server 100 may further support rapid adaptation to fluctuating network conditions by using the second transcoder 122 in conjunction with the first transcoder 120. For example, the second transcoder 122 may be configured to transcode the video stream at a lowest expected data rate, which may be estimated by the network monitor module 140 based, for example, on a history of network performance data or on prior knowledge of the network design. Meanwhile, the first transcoder 120 may continue to operate as the adjusting transcoder that adjusts one or more characteristics of the transcoded video stream based on the network conditions. However, in cases that the transition from one characteristic to another (e.g., from 1080p60 to 1080p30) takes more than a predetermined amount of time (e.g., 100 milliseconds), and/ or the network conditions rapidly fluctuate, the adjustment module 150 may invoke the network interface 170 to switch its input to the second transcoder 122, which may be transcoding, for example, at 720p30 and, therefore, speed up the switching from a first bit rate to a second bit rate without introducing disruption in the video stream being transmitted. More detailed description regarding adaptive rate video processing and transmission can be found in the US Patent application Publication Number 2010/0278271 A1, entitled "METHOD AND SYSTEM FOR ADAPTIVE RATE VIDEO COMPRESSION AND TRANSMISSION," which is incorporated by reference herein.

In one or more implementations of the subject technology, the ABR server 100 may represent a gateway (e.g., a home gateway or an enterprise gateway) serving a number of local ABR clients over the network 180 (e.g., a wireless network). Examples of the ABR client devices (e.g., 190) may include, one or more desktop computers, laptops, tablets, STBs, printers, DVR, etc. At any moment of time, some of the client devices may be at a further distance from the gateway 100 and therefore, may have weaker signals, in cases of some network types such as wireless links, which may adversely affect their throughput and latency. One or more of the client devices may operate on different modulation schemes with different data rate handling capabilities. The client devices may also need different data rates based on the type of their activities at the time. Due to the limited available network bandwidth, the network may be oversubscribed by the client devices. Therefore, an equitable rationing of the available bandwidth between various client devices is desirable.

The gateway of the ABR server 100 may be configured to handle such an equitable division of the available bandwidth. For example, the network monitor module 140 may monitor an available bandwidth of the local network, as described above, and may provide the data associated with the available bandwidth to the adjustment module 150. The adjustment module 150 may dynamically modify encoding characteristics of the ABR profile based on the available bandwidth and invoke the advertising module 160 to advertise the modified ABR profile to the client devices. The modification of the encoding characteristics of the ABR profile may be such that the available bandwidth is divided equitably between the active client devices. For example, when one of the client devices goes off-line the available bandwidth for the active client devices increases.

The additional bandwidth needs to be considered when dynamically modifying the encoding characteristics of the ABR profile advertised to the client devices, so that users of active client devices can have similar experiences based on their data rate requirements. For instance, if two of the client devices are wireless devices that are being used at different distances from the gateway 100 to watch the same movie, the RF bandwidth required to transmit the movie to the two wireless devices at the same quality level may be different. For example, the modulation and coding scheme used for the transmission of the movie to the wireless device that is further from the gateway of the ABR server 100 may require more RF bandwidth than the modulation and coding scheme used for the transmission of the movie that is closer to the gateway of the ABR server 100. Thus, the allocated RF bandwidth for the wireless device that is further from the gateway of the ABR server 100 may be made higher so that the users of both wireless devices can enjoy similar user experiences.

In one or more implementations of the subject technology, the ABR server 100 may support channel bonding. For example, the network interface 170 may be configured to support multiple communication channels (e.g., optical, wired, cable, or various wireless channels such as wireless channels of different standards, Wi-Fi channels and Bluetooth) and may have the capability to aggregate two or more of the communication channels. The video data to be carried through the bonded channel may be provided by one or more transcoders (e.g., the first and/or the second transcoders 120 and/or 122) or by one or more threads of a transcoder. The advertising module 160 may advertise a high data rate ABR profile, via the network interface 170 to the client device 190. The high data rate ABR profile may represent channel bonding and may include information associated with each channel of the multiple communication channels including a stream resolution, segment information, and chunk information. In one or more aspects, a scalable video coding (SVC) scheme may be implemented. In such a scenario, a base-layer at a low video-stream resolution may be transmitted through one communication channel and an enhancement layer at a high video-stream resolution may be transmitted through another communication channel. The ABR server 100, in response to the advertising of the high data rate ABR profile, may receive from the client device 190 information that indicates whether the client device 190 can support channel bonding and/or an amount of channel bonding (e.g., the highest aggregated bandwidth) that the client device 190 can support. The high data rate profile may be related, for example, to high resolution video such as a 4 k resolution.

For the client device 190 to be able to support the channel bonding, the network interface 192, for instance, may need to be configured to support multiple communication channels and be capable of aggregating two or more of the communication channels (e.g., a wired network channel such as a MoCA channel with a Wi-Fi channel) to allow more throughput. The network interfaces 170 and 192 and one or more channel bonding software programs may be able to dynamically change the channel bonding configuration (e.g., the communication channels that are bonded together). In one or more aspects, the network interface 170 may be able to detect whether the client device 190 has channel bonding capability and estimate the amount of channel bonding the client device 190 may be able to support. The ABR server 100 may use the chunk distributor 172 to distribute the video data between one or more aggregated communication channels, as described in greater detail below with respect to FIG. 2.

Figure 2:
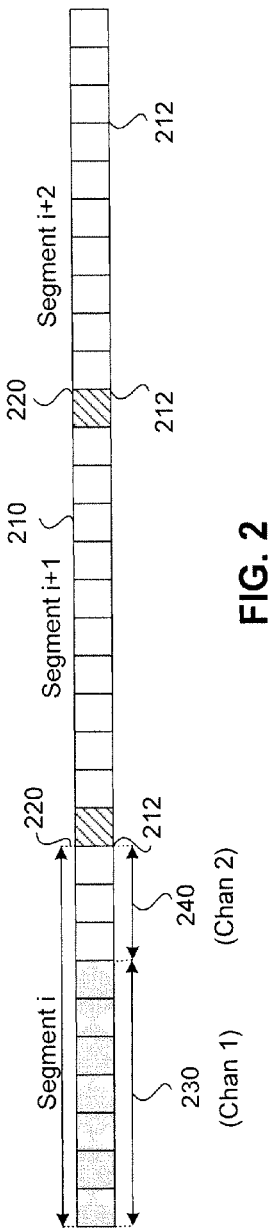
FIG. 2 illustrates an example of a segment structure and a chunk distribution of a video segment between bonded channels of a channel bonding ABR server, in accordance with one or more implementations of the subject technology.

FIG. 2 illustrates an example of a segment structure and a chunk distribution of a video segment between bonded channels of a channel bonding ABR server 100 of FIG. 1, in accordance with one or more implementations of the subject technology. The ABR server 100 may provide video program content (e.g., a news program or a movie) at various data rates (e.g., 1, 10, and 50 Mbps). The channel bonding ABR server 100 may share, for example, a 50 Mbps video stream between two aggregated communication channels (e.g., channel 1, such as a wireless channel, and channel 2, such as an optical channel). The channels 1 and 2 may, for instance, have 30 Mbps and 20 Mbps available bandwidth, respectively. The ABR video data may have a segmented structure, such that video segments (e.g., segments i to i+2) are separated by segment boundaries 220. Each video segment may, for example, be 2-10 seconds long in presentation timeline and may be divided into a number of (e.g., thousands of) smaller portions (e.g., chunks 210), with recognizable boundaries (e.g., chunk boundaries 212).

The channel bonding ABR server 100 may use the chunk distributor 172 of FIG. 1 to distribute chunks of a 50 Mbps video segment (e.g., segment i) between the aggregated channels 1 and 2. For example, the chunk distributor 172 may allocate a group 230 of the chunks (e.g., shaded chunks) of the segment i to channel 1 and a group 240 of the chunks of the same segment to channel 2. The segment information, such as a segment number of the segment i and the chunk information including chunk distribution information such as the chunk numbers associated with the chunks allocated to each of the channels 1 and 2 may be included in the high data rate ABR profile. The high data rate ABR profile can be advertised to the ABR client device 190 of FIG. 1, so that the client device 190 can readily reassemble the chunks of the segment i received in channels 1 and 2 into a corresponding segment. For this reassembly to be smooth and flawless the chunk boundaries 212 and the segment boundaries 220 need to be aligned, such that any specific chunk does not belong to more than one segment. FIG. 2 shows multiple chunks per segment. In some embodiments, each segment can be considered as a chunk for channel bonding purposes, for example, the chunk distributor 172 may allocate segment i to one channel (e.g., channel 1) and segment i+1 to another channel (e.g., channel 2).

Figure 3:
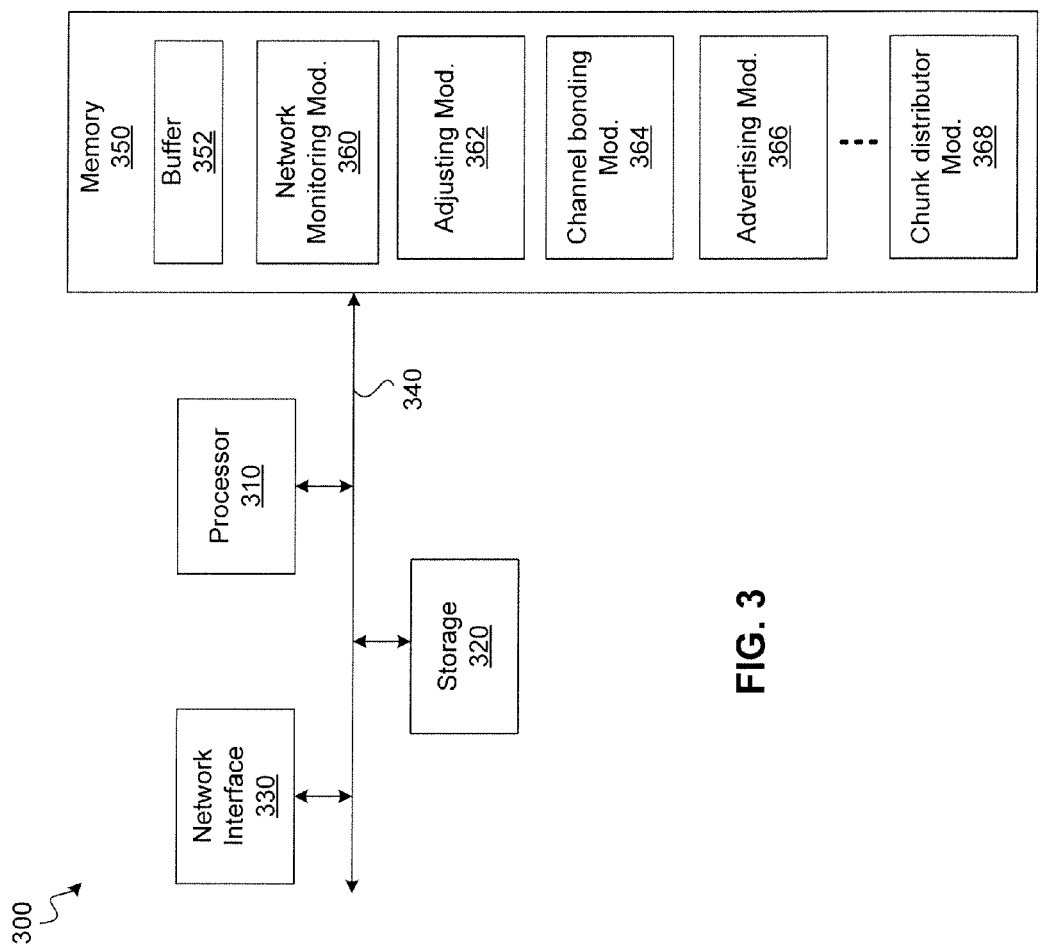
FIG. 3 illustrates an example of an ABR server, in accordance with one or more implementations.

FIG. 3 illustrates an example of an ABR server 300, in accordance with one or more implementations of the subject technology. The ABR server 300 may include a processor 310, a storage device 320, a network interface 330, and memory 350, coupled to one another via a bus 340. The processor may include a number of hardware cores that can perform various functionalities, such as transcoding, scaling, and/or other video/audio processing operations. The network interface 330 may perform communications with other devices, such as ABR client devices (e.g., 190 of FIG. 1). The communications may include receiving a request for a segment of an ABR stream according to an advertised manifest file, information regarding support for channel bonding, and other messages or data and transmitting manifest files, including high data rate ABR profiles, and video data in response to various requests from the other devices. The memory 350 may include RAM, DRAM, static RAM (SRAM), flash memory, etc. The storage device 320 may include a DVR, a disk drive, flash memory, DRAM, or other types of memory.

The memory 350 may include a number of buffers such as a buffer 352 (e.g., a video buffer) and a number of program modules that can be executed by the processor 310. The program modules may include a network monitoring module 360, an adjusting module 362, a channel bonding module 364, an advertising module 366, and a chunk distributor module 368, which when executed by the processor 310 may perform the functionalities of the corresponding modules described above with respect to the ABR server 100 FIG. 1.

Figure 4:
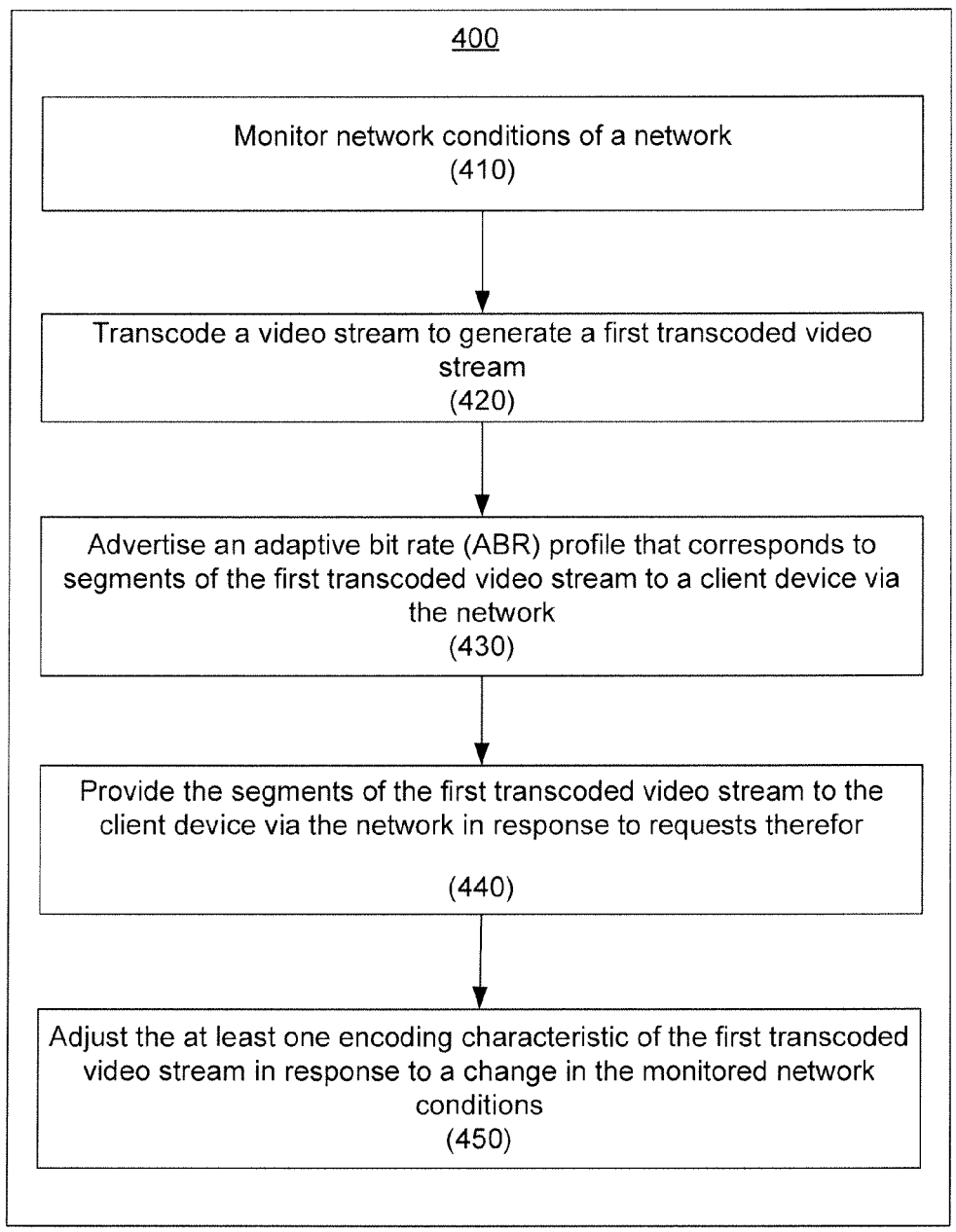
FIG. 4 illustrates an example of a method for transmitting an adaptive bit rate (ABR) stream, in accordance with one or more implementations.

FIG. 4 illustrates an example of a method 400 for transmitting segments of an ABR stream, in accordance with one or more implementations of the subject technology. The steps of the method 400 do not need to be performed in the order shown and one or more steps may be omitted.

The ABR server 100 monitors network conditions including a network bandwidth of a network 180, e.g. by using the network monitor module 140 (410). The ABR server 100 transcodes a video stream, e.g. by using the first transcoder 120, to generate a transcoded video stream (420). The ABR server 100 may advertise an ABR profile to a client device 190, e.g. an ABR profile that corresponds to the transcoded video stream (430). The ABR server 100 may provide segments of the transcoded video stream to the client device 190 via the network 180, in response to requests therefor (440). In response to a change in the network conditions, the ABR server 100 may adjust one or more encoding characteristic of the transcoded video stream, e.g. by using the adjustment module 150 (450). Thus, the client device 190 may request segments of only a single ABR profile, and the ABR server 100 continually adjusts the encoding characteristics of the single ABR profile, e.g. to compensate for fluctuating network conditions.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for adaptive bit rate (ABR) streaming, the method comprising:
   monitoring network conditions of a network;
   transcoding a video stream to generate a first transcoded video stream, wherein at least one encoding characteristic of the first transcoded video stream is based at least in part on the monitored network conditions;
   advertising an adaptive bit rate (ABR) profile that corresponds to segments of the first transcoded video stream to a client device via the network;
   providing the segments of the first transcoded video stream to the client device via the network in response to requests therefor; and
   adjusting the at least one encoding characteristic of the first transcoded video stream in response to a change in the monitored network conditions.

2. The method of claim 1, wherein the advertised ABR profile is updated when the at least one encoding characteristic is adjusted, and wherein the advertised ABR profile comprises a single ABR profile.

3. The method of claim 1, further comprising:
   adjusting the at least one characteristic of the transcoded video stream irrespective of boundaries of the segments of the transcoded video stream.

4. The method of claim 1, further comprising:
   transcoding the video stream at a lowest expected data rate to generate a second transcoded video stream; and
   providing segments of the second transcoded video stream to the client device, in response to the requests for the first transcoded video stream, when a rapid deterioration of the network conditions is detected.

5. The method of claim 1, further comprising:
   monitoring an available bandwidth of the network; and
   dynamically modifying ABR profiles advertised to a plurality of ABR clients based on the available bandwidth and a number of active ABR clients, such that the available bandwidth is equitably allocated amongst the active ABR clients.

6. The method of claim 1, further comprising:
   advertising a high data rate ABR profile that supports channel bonding; and
   in response to the advertising, receiving, from the client device, information that indicates whether the client device supports the channel bonding and an amount of the channel bonding that the client device supports.

7. The method of claim 6, further comprising performing the channel bonding by:
   aggregating a plurality of communication channels each associated with a data rate, wherein the aggregating provides a bonded channel with a data rate that is substantially equal to a sum of the data rates associated with the plurality of communication channels.

8. The method of claim 7, further comprising:
   partitioning the first transcoded video stream into a plurality of video segments, wherein each of the plurality of video segments is divided into one or more chunks with boundaries of the chunks being aligned with boundaries of the segments, and wherein the one or more chunks of each video segment may be provided to the client device via a different communication channel.

9. The method of claim 7, wherein the high data rate ABR profile is related to a high resolution video transmission, wherein the high resolution video transmission comprises an ultra-high definition (UHD) video transmission, and wherein the high data rate ABR profile comprises information associated with each of the plurality of communication channels including a video-stream resolution, segment information, and chunk information.

10. A device for providing adaptive bit rate (ABR) streaming, the device comprising:
    a first transcoder configured to transcode a video stream based at least in part on at least one encoding characteristic to generate a first transcoded video stream;
    a network monitor configured to monitor network conditions including a network bandwidth of a network;
    an adjustment module configured to cause the first transcoder to adjust the at least one encoding characteristic in response to a change in the network conditions;
    an advertising module configured to advertise to a client device an ABR profile that corresponds to the first transcoded video stream, wherein the advertising module updates the advertised ABR profile when the at least one encoding characteristic is adjusted; and
    a network interface configured to transmit segments of the first transcoded video stream to the client device via the network in response to requests therefor.

11. The device of claim 10, wherein the adjustment module is further configured to adapt to rapid fluctuations in the network conditions by causing the first transcoder to adjust the at least one characteristic of the first transcoded video stream.

12. The device of claim 11, wherein the device further comprises:

a second transcoder that is configured to transcode the video stream at a lowest expected data rate to generate a second transcoded video stream, wherein the network conditions comprises a network performance characterized by a throughput and a latency associated with the network and the network interface is configured to transmit segments of the second transcoded video stream when a rapid deterioration in the network conditions is detected.

13. The device of claim 10, wherein:
the network monitor is configured to monitor an available bandwidth of the network; and
the advertising module is configured to dynamically modify ABR profiles advertised to a plurality of ABR clients based on the available bandwidth and a number of active ABR clients, such that the available bandwidth is allocated equitably amongst the active ABR clients.

14. The device of claim 10, wherein:
the advertising module is further configured to advertise a high data rate profile that supports channel bonding; and
the network interface is a channel bonded network interface that is configured to receive from the client device, in response to the advertising, information that indicates whether the client device supports channel bonding and an amount of channel bonding that the client device supports.

15. The device of claim 14, wherein the channel bonded network interface is further configured to:
support an aggregation of a plurality of communication channels, wherein the plurality of communication channels include communication channels with different data rates; and
support a bonded channel with higher data rate that is substantially equal to a sum of the data rates associated with the plurality of communication channels.

16. The device of claim 15, wherein the first transcoder is configured to:
partition the first transcoded video stream into a plurality of video segments;
divide each of the plurality of video segments into one or more chunks;
align chunk boundaries with segment boundaries; and wherein the device further comprises a chunk distributor configured to provide to the client device the one or more chunks of each video segment via a different communication channel.

17. The device of claim 15, wherein the high data rate profile is related to high resolution video transmitting, wherein the high resolution video transmitting comprises an ultra-high definition (UHD) transmitting, and wherein the high data rate profile comprises information associated with each of the plurality of communication channels including a video-stream resolution, segment information, and chunk information.

18. The device of claim 14, wherein:
the network comprises a wireless network, and
the high data rate profile indicates a bit rate, a frame rate, and a frame size.

19. A system for providing adaptive bit rate (ABR) streaming, the system comprising:
memory configured to store one or more program modules;
one or more processors coupled to the memory and configured to execute the one or more program modules to:
transcode, at an ABR server, a video stream and generate a transcoded video stream;
monitor network conditions including a network bandwidth of a network;
adjust at least one characteristic of the transcoded video stream in response to a change in the network conditions;
advertise an ABR profile corresponding to the transcoded video stream to a client device; and
transmit segments of the transcoded video stream to the client device via the network in response to requests therefor, wherein a first encoding characteristic of a first segment transmitted to the client device differs from a second encoding characteristic of a second segment transmitted to the client device.

20. The system of claim 19, wherein the one or more processors are further configured to execute the one or more program modules to:
adapt to fluctuations in the network conditions by adjusting the at least one characteristic of the transcoded video stream within one of the segments of the transcoded video stream.

* * * * *